(12) United States Patent
Murad et al.

(10) Patent No.: US 10,739,455 B2
(45) Date of Patent: Aug. 11, 2020

(54) METHOD AND APPARATUS FOR ACQUIRING DEPTH INFORMATION USING CAMERAS FROM DIFFERENT VEHICLES

(71) Applicant: GM GLOBAL TECHNOLOGY OPERATIONS LLC, Detroit, MI (US)

(72) Inventors: Mohannad Murad, Troy, MI (US); Fan Bai, Ann Arbor, MI (US); Joseph G. Machak, Oakland Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 224 days.

(21) Appl. No.: 15/988,082

(22) Filed: May 24, 2018

(65) Prior Publication Data
US 2019/0361118 A1    Nov. 28, 2019

(51) Int. Cl.
| | | |
|---|---|---|
| G01S 17/08 | (2006.01) | |
| G01S 17/89 | (2020.01) | |
| H04N 1/32 | (2006.01) | |
| G01S 17/86 | (2020.01) | |

(52) U.S. Cl.
CPC .............. G01S 17/08 (2013.01); G01S 17/86 (2020.01); G01S 17/89 (2013.01); H04N 1/32101 (2013.01); *H04N 2201/3215* (2013.01)

(58) Field of Classification Search
CPC .......... G01S 7/022; G01S 17/08; G01S 17/86; G01S 17/89; H04N 1/32101; H04N 2201/3215
See application file for complete search history.

(56) References Cited

U.S. PATENT DOCUMENTS

| | | | | |
|---|---|---|---|---|
| 4,978,983 | A * | 12/1990 | Stanglfors .............. | G03B 13/14 348/333.03 |
| 6,678,394 | B1 * | 1/2004 | Nichani ............... | G05D 1/0251 348/169 |
| 9,426,450 | B1 * | 8/2016 | Zhang ...................... | G02B 3/12 |
| 10,375,357 | B2 * | 8/2019 | Wang ..................... | H04N 7/181 |
| 2014/0009611 | A1 * | 1/2014 | Hiebl ........................ | F41G 1/36 348/143 |
| 2018/0318644 | A1 * | 11/2018 | Forsgren ................ | A63B 57/00 |

* cited by examiner

*Primary Examiner* — Dao L Phan
(74) *Attorney, Agent, or Firm* — Lorenz & Kopf, LLP (57) ABSTRACT

In various embodiments, methods, systems, and vehicles are provided for distance determinations using cameras from different vehicles. The system includes a first camera onboard a first vehicle, providing a first image, the first image having therein an object of interest (OOI) for which a distance from the first vehicle is desired; and a second camera, providing second camera data including a second image having therein the OOI. The system further includes a control module configured to process and time synchronize first camera data and second camera data to generate a distance determination for the OOI, using the first camera data, the second camera data, and a distance between the first and second camera.

20 Claims, 5 Drawing Sheets

METHOD AND APPARATUS FOR ACQUIRING DEPTH INFORMATION USING CAMERAS FROM DIFFERENT VEHICLES

TECHNICAL FIELD

The technical field generally relates to the vehicles and, more specifically, to methods and systems for acquiring depth information using cameras from different vehicles.

BACKGROUND

Many vehicles include cameras for detecting objects and other surroundings in proximity to the vehicle, and displaying images of them. As vehicles increasingly rely on data and information from cameras for operation, the quality of the camera images, and particularly the precision of the location of objects based on camera images, becomes increasingly important. High quality object location information for objects may also be shared with other vehicles, such as those for which their on-board cameras are occluded or blocked by other obstacles on the road, and/or those for which one or more conditions may be present that make it difficult for an on-board camera to ascertain situation awareness for the vehicle.

Accordingly, it is desirable to provide enhanced methods and systems for determining object location and providing depth perception in vehicles having on-board cameras. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a console drawer assembly is provided.

In one exemplary embodiment, a method is provided. The method includes, at a control module, (a) obtaining from a first camera onboard a first vehicle, first camera data including a first focal length and a first reflection including an object of interest (OOI) to which a distance, D, from the first vehicle is desired; (b) identifying a second camera with second camera data having therein a second reflection including the OOI, the second camera being onboard a second vehicle, the second camera data further including a second focal length, and a second distance to the OOI based on the second reflection; (c) receiving from the second camera, the second camera data; (d) determining a distance between the first camera and the second camera; (e) time synchronizing the first camera data and the second camera data; and (f) processing the first camera data, the second camera data, and the distance between the first and second cameras to determine the D.

Also, in one embodiment, first camera data further includes (i) a location and orientation of a first aperture, (ii) a location and orientation of a first image surface, and (iii) a time stamp for the first reflection; and second camera data further includes (i) a location and orientation of a second aperture, (ii) a location and orientation of a second image surface, and (iii) a time stamp for the second reflection.

Also, in one embodiment, the method includes referencing first vehicle data including a first vehicle speed; receiving second vehicle data including a second vehicle speed; and wherein determining the D is further based on the first vehicle data and the second vehicle data.

Also, in one embodiment, the method includes time-stamping the D, as D-1; repeating (a)-(e) to generate a second D; and time-stamping the second D, as D-2.

Also, in one embodiment, the method includes determining a velocity of the OOI using D-1 and D-2.

Also, in one embodiment, the method includes determining an acceleration of the OOI using D-1 and D-2.

Also, in one embodiment, the method includes transmitting the D-1 and the D-2 to a vehicle with a camera that does not have a field of view including the OOI.

Also, in one embodiment, the method includes generating commands for a display system to render a stereo vision image including the OOI using the D.

In another exemplary embodiment, a system includes: a first camera onboard a first vehicle, providing first camera data having a first focal length and a first reflection including an object of interest (OOI) to which a distance, D, from the first vehicle is desired; a second camera with second camera data having therein a second reflection including the OOI, the second camera being onboard a second vehicle, the second camera data further having a second focal length, and a second distance to the OOI based on the second reflection; and a control module configured to process first camera data and second camera data to: (a) determine a distance between the first camera and the second camera; (b) time synchronize the first camera data and the second camera data; and (c) process the first camera data, the second camera data, and the distance between the first and second cameras to determine the D.

Also, in an embedment, the first camera data further includes (i) a location and orientation of a first aperture, (ii) a location and orientation of a first image surface, and (iii) a time stamp for the first reflection; and the second camera data further includes (i) a location and orientation of a second aperture, (ii) a location and orientation of a second image surface, and (iii) a time stamp for the second reflection.

Also, in an embodiment, the control module is further configured to: reference first vehicle data including a first vehicle speed; receive second vehicle data including a second vehicle speed; and determine the D further based on the first vehicle data and the second vehicle data.

Also, in an embodiment, the control module is further configured to: time-stamp the D, as D-1; repeat (a) and (b) to generate a second D; and time-stamp the second D, as D-2.

Also, in an embodiment, the control module is further configured to determine a velocity of the OOI using D-1 and D-2.

Also, in an embodiment, the control module is further configured to determine an acceleration of the OOI using D-1 and D-2.

Also, in an embodiment, the control module is further configured to transmit the D-1 and the D-2 to a vehicle that does not have a field of view including the OOI.

Also, in an embodiment, the control module is further configured to generate commands for a display system to render a stereo vision image including the OOI using the D.

In another exemplary embodiment, a vehicle is provided. The vehicle includes: a navigation system; a first camera, providing first camera data having a first focal length and a first reflection including an object of interest (OOI) to which a distance, D, from the vehicle is desired; and a control module operationally coupled to the navigation system and the camera, the control module configured to: search for a second camera having second camera data including a second image having therein the OOI, and a second focal length; receive, from the second camera, the second camera data; determine a distance between the first camera and the second camera; time synchronize the first camera data and the second camera data; and determine the D, using the first camera data, the second camera data, and the distance between the first and second cameras.

Also, in an embodiment, the control module is further configured to: time-stamp the D, as D-1; repeat (a) and (b) to generate a second D; and time-stamp the second D, as D-2.

Also, in an embodiment, the control module is further configured to determine a velocity of the OOI using D-1 and D-2.

Also, in an embodiment, the control module is further configured to transmit the D-1 and the D-2 to a wireless network.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
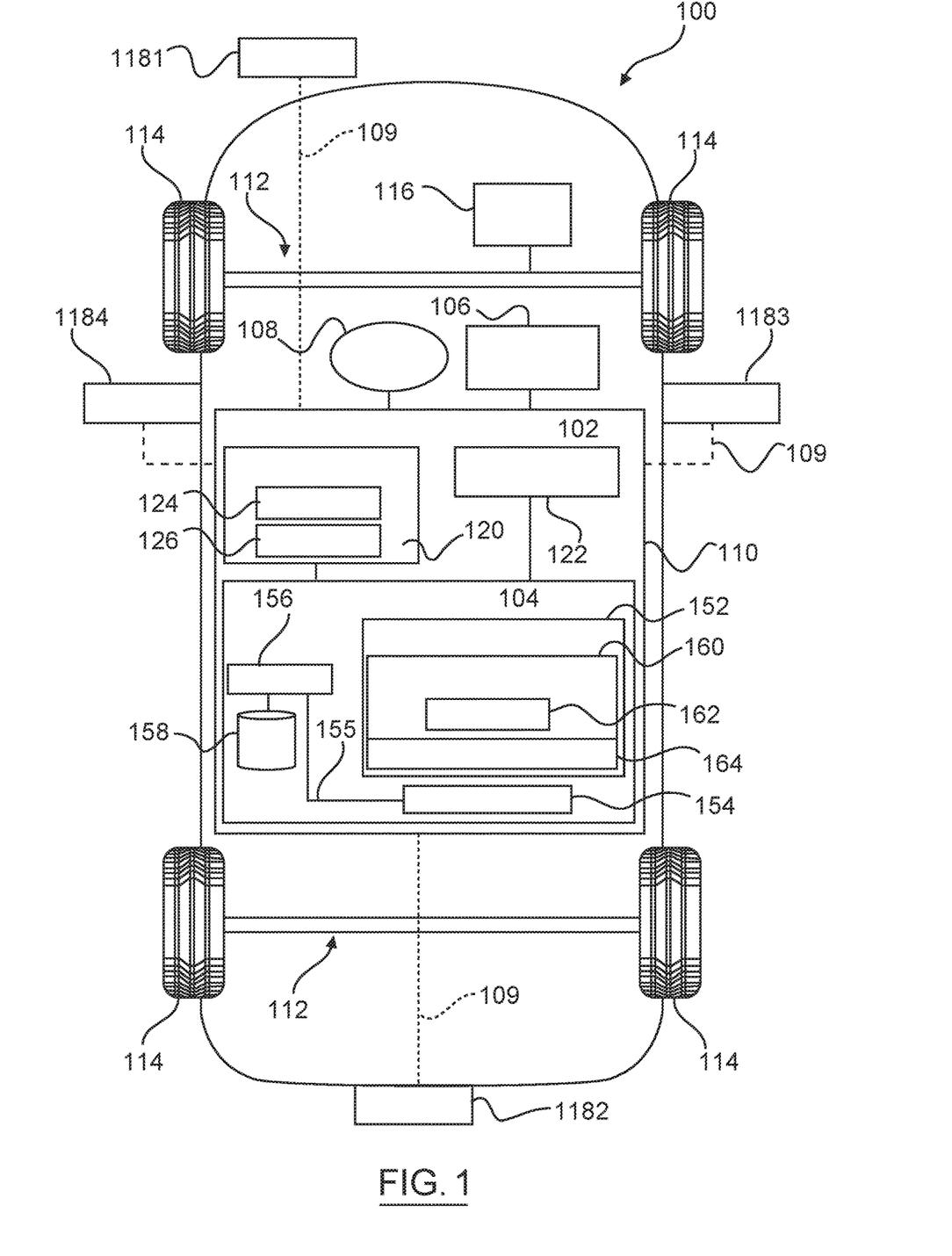
FIG. 1 is a functional block diagram of a vehicle that includes cameras and a control system for determining depth information for the vehicle using the cameras and information from one or more other cameras that are remote from the vehicle.

FIG. 1 illustrates a vehicle 100, according to an exemplary embodiment. As described in greater detail further below, the vehicle 100 includes a control system for determining depth information 102 coupled to one or more cameras 1181, 1182, 1183, and 1184, (collectively referred to herein as cameras 118) and to a display system 108 (having one or more display devices for visual presentation of information). Also, as depicted in FIG. 1, in certain embodiments the vehicle 100 may include a navigation system 106 that is coupled to the for determining depth information 102.

The control system for determining depth information 102 (shortened herein to control system 102) may be integrated with a more comprehensive vehicle control system. As such, in various embodiments, the control system 102 provides various control actions for the vehicle 100, including the capturing of the images from the cameras 118 and the receipt of images and related information taken from cameras on nearby vehicles and/or infrastructure. The control system 102 is understood to receive and process information from on-board systems as well as from other vehicles in the course of generating depth information and commands for a display system 108 to render stereo vision images, and controlling travel of the vehicle 100, as appropriate, such as to avoid contact with other vehicles and/or other objects (e.g., by automatically controlling braking and/or steering of the vehicle 100, as appropriate). In various embodiments, the control system 102 may transmit images captured from cameras 118 and information about cameras 118 to other nearby vehicles and/or infrastructure. In various embodiments, the control system 102 may transmit determined distances, determines locations, determined velocities, and determined accelerations of objects, to a wireless network, or other vehicles.

In various embodiments, the vehicle 100 comprises an automobile. As such, the vehicle 100 may be any one of many different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, and/or one or more other types of mobile platforms (e.g., a robot, a ship, and so on) and/or other systems capable of supporting one or more cameras 118.

The vehicle 100 includes a body 110 that is arranged on a chassis 112. The body 110 substantially encloses other components of the vehicle 100. The body 110 and the chassis 112 may jointly form a frame. The vehicle 100 also includes a plurality of wheels 114. The wheels 114 are each rotationally coupled to the chassis 112 near a respective corner of the body 110 to facilitate movement of the vehicle 100. In one embodiment, the vehicle 100 includes four wheels 114, although this may vary in other embodiments (for example for trucks and certain other vehicles).

A drive system 116 is mounted on the chassis 112, and drives the wheels 114. The drive system 116 preferably comprises a propulsion system. In certain exemplary embodiments, the drive system 116 comprises an internal combustion engine and/or an electric motor/generator, coupled with a transmission thereof. In certain embodiments, the drive system 116 may vary, and/or two or more drive systems 116 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

In various embodiments, the cameras 118 capture images from around the vehicle 100, for example from various sides of the vehicle 100 (e.g., front side, rear side, passenger side, and driver side), and provide the images for processing, for example to assist the vehicle 100 and/or other nearby vehicles in travelling along a roadway (e.g., to avoid contact with other vehicles and/or other objects). In certain embodiments, cameras 118 may also be disposed on one or more other locations of the vehicle 100, non-limiting examples include: on a grille of a vehicle 100, on sides of a vehicle 100, in a rear-view mirror of a vehicle 100, on rear of the vehicle 100. Various combinations of these locations may be used to create a surround view for the vehicle 100. The cameras 118 may provide images for two-dimensional and/or three-dimensional viewing on the display system 108, which is disposed inside the vehicle 100 (i.e. inside the body 110 of the vehicle 100). The camera images may also be provided to other components of the vehicle control system (not shown) for use in vehicle control, and so on.

In the embodiment of FIG. 1, the cameras 118 are mounted on the vehicle 100 and located and configured to provide, with respect to the vehicle 100, a forward-looking field of view (camera 1181), a right-side field of view (camera 1183) a left-side field of view (camera 1184), and a backward-looking field of view (camera 1182). As alluded to above, in various embodiments, the number, locations, and/or placement of the cameras 1118 may vary (e.g., in certain embodiments, a single camera may be used, and so on). Regardless of the location and configuration of the one or more cameras 118, they are in operable communication with (via communications link 109), and under the control of, the control system 102, as depicted in FIG. 1.

In various embodiments, the navigation system 106 provides real-time location information for the vehicle 100. To this end, in various embodiments, the navigation system 106 comprises a satellite-based system, such as a global positioning system (GPS) and/or other satellite-based system, and provides location information regarding a current location and position of the vehicle 100. Navigation data includes, but is not limited to, vehicle location, vehicle position, vehicle direction of travel, vehicle speed, and vehicle acceleration. As used herein, navigation data is interchangeable with vehicle data. Also, as used herein, "real-time" is interchangeable with current and instantaneous. The navigation system 106 is configured to provide real-time navigation data and/or information regarding operation of the vehicle 100. In certain embodiments, the navigation system 106, and/or one or more components thereof, may be disposed within and/or be part of the control system 102. In other embodiments, the navigation system 106 may be coupled to the control system 102.

In various embodiments, the display system 108 displays images, such as images from the cameras 118 of the vehicle 100, and in certain embodiments, images received from respective cameras on other vehicles. In one embodiment, the display system 108 is located on a center console of the vehicle 100. However, this may vary in other embodiments. In various other embodiments, the display system 108 may be part of a radio display, a navigation display, and/or other display, for example as part of or in proximity to the center console. In certain other embodiments, the display system 108 may be part of one or more other vehicle components, such as a rear view mirror. In one exemplary embodiment the display system 108 comprises a liquid crystal display (LCD) screen or a light emitting diode (LED) screen. However, this may vary in other embodiments.

The control system 102 controls operation of the cameras 118, and determines object distance from the host vehicle 100, and object dimensions, based on data from the cameras 118 of the host vehicle 100, the host vehicle data, and camera data and vehicle data from other nearby vehicles. In various embodiments, the control system 102 provides these and other functions in accordance with the steps of a method 500 discussed further below, in connection with FIG. 5.

As shown in FIG. 1, in various embodiments, the control system 102 is disposed within the body 110 of the vehicle 100. In one embodiment, the control system 102 is mounted on the chassis 112. In other embodiments, the control system 102 and/or one or more components thereof may be disposed outside the body 110, for example on a remote server, in the cloud, or in a remote smart phone or other device where image processing is performed remotely. In addition, in certain embodiments, components of the control system 102 may be disposed within and/or integrated with the cameras 118, navigation system 106, and/or display system 108, and/or within and/or or as part of one or more other vehicle systems.

With reference to FIG. 1, the control system 102 may be coupled to the cameras 118 via one or more communications links 109, and receive camera images and reflections from the cameras 118 via the communications link 109. In certain embodiments, the communications link 109 comprises one or more wired connections, such as one or more cables (e.g. coaxial cables and/or one or more other types of cables). In other embodiments, the communications link 109 may comprise one or more wireless connections, e.g., using transceiver 122 depicted in FIG. 1.

The control system 102 may include or be integrated with a sensor system 120 and a transceiver 122. As depicted in FIG. 1, the sensor system 120 includes one or more detection sensors 126. In various embodiments, the detection sensors 126 include one or more sensors (e.g., radar, lidar, sonar, ultrasonic and so on) that detect objects (e.g., moving vehicles) in proximity to the vehicle. Also in various embodiments, the sensor system 120 may further comprise one or more other sensors 128 (e.g., wheel speed sensors, accelerometers, wheel position sensors, steering angle sensors, turn direction sensors, gear sensors, and so on) that provide data pertaining to vehicle operation. Accordingly, it may be appreciated, that in various embodiments the sensor system 120 may have integrated therewith some or all of the components of the navigation system 106, the cameras 118, and/or various other types of sensors. The sensor system 120 generates sensor data, and provides the sensor data to a control module 104 for processing.

The transceiver 122 transmits vehicle information and camera data to, and receives vehicle data and camera images from, vehicles, infrastructure, and objects external to the host vehicle 100. Specifically, in various embodiments, the transceiver 122 transmits and receives (via instructions provided by the control module 104) camera images, under appropriate circumstances, to other vehicles and/or aspects of infrastructure. The transceiver 122 also transmits determined distances, determined velocities, and determined accelerations of objects, to a wireless network, or other vehicles. It will be appreciated that in certain embodiments the transceiver 122 may comprise separate transmitters and/or receivers, or the like.

Within the control system 102, the control module 104 controls the operations and functions related to the control system 102. In certain embodiments, the control module 104 also controls various functionality of the vehicle 100 (e.g., steering and braking), for example to avoid obstacles, using the camera images and data. The control module 104 is specifically responsible for providing a vehicle 100 with distance determinations (also referred to herein as depth determinations) for detected objects and their surroundings for use in stereo vision imaging for the vehicle 100. The control module 104 processes vehicle information from the host vehicle 100, images obtained from on-board cameras 11, and camera images and related information received from other vehicles and/or infrastructure. In various embodiments, the control module 104 provides these and other functions in accordance with the steps of the method 500 discussed further below.

In one embodiment, the control module 104 is disposed within the control system 102, within the vehicle 100. Accordingly, in various embodiments, the control module 104 may be coupled to the cameras 118, the navigation system 106, the sensor system 120, the transceiver 122, and the display system 108. In certain embodiments, the control module 104 (and/or components thereof, such as the processor 156 and/or other components) may be part of and/or disposed within the cameras 118, the navigation system 106, the display system 108, and/or one or more other vehicle components. Also in certain embodiments, the control module 104 may be disposed in one or more other locations of the vehicle 100. In addition, in certain embodiments, multiple control modules 104 may be utilized (e.g. one control module 104 within the vehicle 100 and another control module 104 within the cameras 118, the navigation system 106, and/or the display system 108), among other possible variations. In addition, in certain embodiments, the control module 104 can be placed outside the vehicle, such as in a remote server, in the cloud or on a remote smart device.

As used herein, the term "control module" 104 refers to any hardware, software, firmware, electronic control component, processing logic, and/or processor device, individually or in any combination, configured as a means for facilitating communications and/or interaction between the elements of the system 102 and performing additional processes, tasks and/or functions to support operation of the system 102, as described herein. Depending on the embodiment, the control module 104 may be implemented or realized with a general purpose processor (shared, dedicated, or group) controller, microprocessor, or microcontroller, and memory that executes one or more software or firmware programs; a content addressable memory; a digital signal processor; an application specific integrated circuit (ASIC), a field programmable gate array (FPGA); any suitable programmable logic device; combinational logic circuit including discrete gates or transistor logic; discrete hardware components and memory devices; and/or any combination thereof, designed to perform the functions described herein.

As depicted in FIG. 1, in an embodiment, the control module 104, includes a processor 150 and a memory 152. The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals. The memory 152 maintains data bits and may be utilized by the processor 150 as storage and/or a scratch pad. The memory 152 may be located on and/or co-located on the same computer chip as the processor 150. In the depicted embodiment, the memory 152 stores instructions and applications 160 and one or more configurable variables in stored variables 164. Information in the memory 152 may be organized and/or imported from an external data source 140 during an initialization step of a process; it may also be programmed via a user input device 130.

A novel program 162 is embodied in the memory 152 (e.g., RAM memory, ROM memory, flash memory, registers, a hard disk, or the like) or another suitable non-transitory short or long-term storage media capable of storing computer-executable programming instructions or other data for execution. The program 162 includes rules and instructions which, when executed, cause the system 102 to perform the functions, techniques, and processing tasks associated with the operation of the system 102 described herein.

Based in part on being programmed with program 162, the processor 150 and the memory 152 form a novel vector based depth perception processing engine that performs the processing activities of the system 102. During operation, the processor 150 loads and executes one or more programs, algorithms and rules embodied as instructions and applications 160 contained within the memory 152 and, as such, controls the general operation of the control module 104 as well as the system 102. In executing the process described herein, the processor 150 specifically loads and executes the instructions embodied in the program 162. Additionally, the processor 150 is configured to, in accordance with the program 162: process received inputs from cameras; reference any of the databases; and, determine depth information, in the form of a distance between a host vehicle 100 and an object of interest using vector based distance determination methods. The control module 104 may further generate display commands that command the display system 108 to render stereo vision images thereon that are consistent with the determined distance.

In various embodiments, the processor/memory unit of the control module 104 may be communicatively coupled (via a bus 155) to an input/output (I/O) interface 154, and a database 158. The bus 155 serves to transmit programs, data, status and other information or signals between the various components of the control module 104. The bus 155 can be any suitable physical or logical means of connecting computer systems and components. This includes, but is not limited to, direct hard-wired connections, fiber optics, infrared and wireless bus technologies.

The I/O interface 154 enables intra control module 104 communication, as well as communications between the control module 104 and other system 102 components (i.e., via bus 103), and between the control module 104 and the external data sources 140. The I/O interface 154 may include one or more network interfaces and can be implemented using any suitable method and apparatus. In various embodiments, the I/O interface 154 is configured to support communication from an external system driver and/or another computer system. Also, in various embodiments, the I/O interface 154 may support communication with technicians, and/or one or more storage interfaces for direct connection to storage apparatuses, such as the database 158. In one embodiment, the I/O interface 154 obtains data from external data source(s) 140 directly.

The database 158 may include a camera-specific parameters database (comprising camera-specific parameters for the one or more cameras 118, as well as for a variety of other cameras that may be utilized on other vehicles and infrastructure) and parameters and instructions for processing user inputs and rendering images, as described herein. In some embodiments, the database 158 is part of the memory 152. In various embodiments, the database 158 is integrated, either within the control module 104 or with other components of the system 102.

In some embodiments, the control module 104 may be integrated with some or all of the cameras 118, the navigation system 106, the display system 108, the sensor system 120, and/or the transceiver 122. In addition, it will be appreciated that the control module 104 may otherwise differ from the embodiment depicted in FIG. 1. For example, the control module 104 may be coupled to or may otherwise utilize one or more remote computer systems and/or other control systems, for example as part of one or more of the above-identified vehicle 100 devices and systems.

It will be appreciated that while this exemplary embodiment is described in the context of a fully functioning processing engine using a processor 156 and a memory 152, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 156) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the control module 104 may also otherwise differ from the embodiment depicted in FIG. 1, for example in that the computer system of the control module 104 may be coupled to or may otherwise utilize one or more remote computer systems and/or other control systems.

Figure 2:
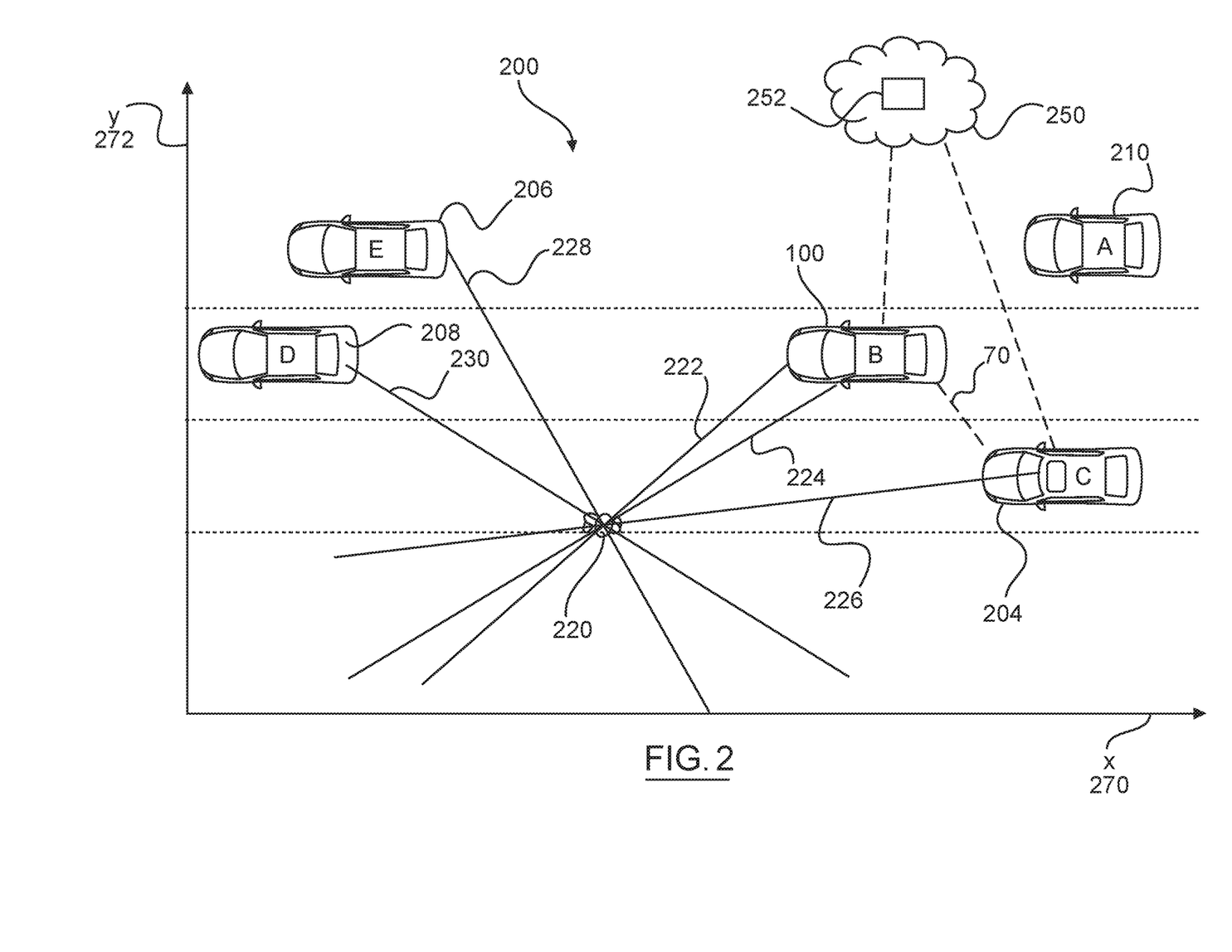
FIG. 2 is an illustration showing a roadway in which a host vehicle is in proximity to an object while driving alongside, and in communication with, other vehicles, in accordance with an exemplary embodiment.

FIG. 2 is an illustration in accordance with an implementation of the present disclosure showing a roadway 200. The roadway 200 includes the vehicle 100 of FIG. 1 along with neighbor vehicle 204, neighbor vehicle 206, neighbor vehicle 208, and neighbor vehicle 210. A pedestrian 220 is shown as an exemplary object of interest (OOI) to which the system 102 determines a distance, however it is to be understood that the system 102 continuously determines the depth information for use in stereo vision on a plurality of detected objects external to the vehicle 100. The pedestrian 220 is shown at a location on roadway 200 that is slightly in front of, but within a field of view of, cameras on host vehicle 100 and neighbor vehicle 204. Vector 222 represents a direct line from a front located camera 1181 on the host vehicle 100 to the pedestrian 220, and vector 224 represents a direct line of view from a camera 1184 located on a left (driver) side of host vehicle 100 to the pedestrian 220. Neighbor vehicle 206 and neighbor vehicle 208 are depicted as having the pedestrian 220 in the field of view from their respective rear-facing cameras (shown with vector 228 and vector 230, respectively). Neighbor vehicle 210 is shown in a location in which it has a blocked field of view from any of its respecting cameras. In various embodiments, the other neighbor vehicles 204, 206, 208, and 210 include components (such as a camera, a display, navigation system, and a control system) that are similar in function to the respective components of the vehicle 100 of FIG. 1.

The herein described system 102 is not reliant upon cameras being placed in specific locations on vehicles; instead, the transmitted camera data from vehicles includes camera images (and reflections, as described below) as well as corresponding location, configuration, and specification information for the camera of origin for each camera image. The camera data is sufficient to instantaneously map camera locations onto a cartesian coordinate system and perform the novel processing steps described herein. Camera data is further described in connection with FIGS. 3 and 4.

As depicted in FIG. 2, the vehicles 100, 204 (and, in certain embodiments, aspects of an infrastructure) communicate directly via wireless links 70, or via one or more wireless networks 250. In various embodiments, the wireless networks 250 and direct wireless links 70 may include short range communications systems such as dedicated short-range communication (DSRC), WiFi, peer-to peer, and device to device (D2D), communication operated on different licensed/unlicensed radio frequency bands, and long-range communication technology such as mainstream cellular communication (2G/3G/4G/5G) and other customized/proprietary variants of above-mentioned cellular communication systems. Also in certain embodiments, the vehicles 100, 204 and infrastructure communicate, via the wireless communication networks 250, and further with a remote server 252. In various embodiments, the remote server 252 includes structural features and performs functions similar to the control system 102 of FIG. 1, for example including the use of a transceiver to transmit and receive data, a memory 152 to store data, a processor 156 to make distance determinations and provide depth information and stereo vision processing and/or other vehicle control for the vehicles 100, 204 and infrastructure, and so on. It will be appreciated that each the wireless networks 250 and direct wireless links 70 may include therewith appropriate authentication protocols. Additionally, each wireless network 250 and direct wireless link 70 also exchanges fine time-measurement information (referred to herein as time stamps for shorthand) between any two communication entities, so that the relevant parties involving in a communication are properly time synchronized.

Figure 3:
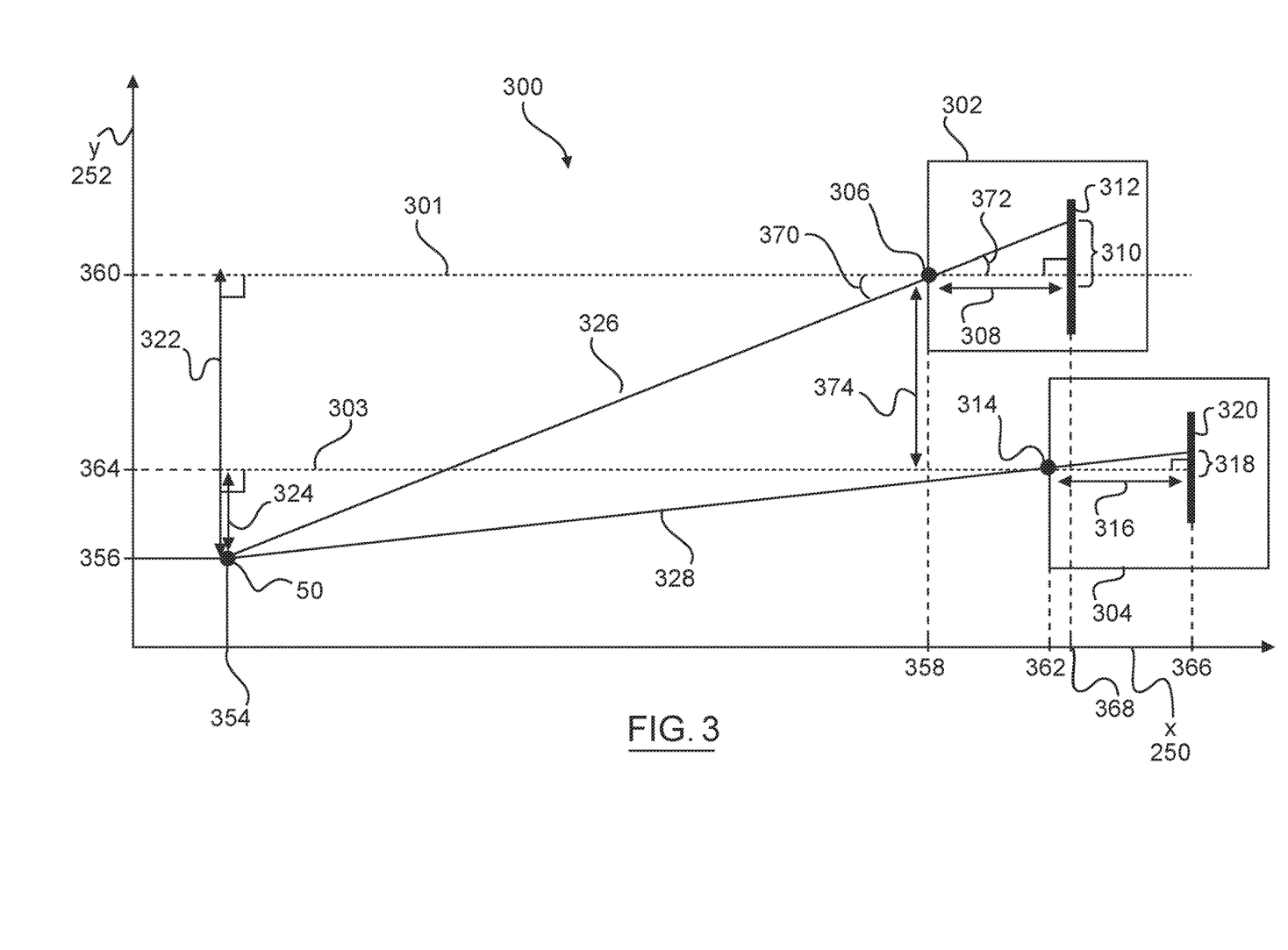
FIGS. 3-4 are illustrations showing measurements and camera data utilized in generating determining depth information, in accordance with an exemplary embodiment.

Turning now to FIG. 3, features of the cameras 118 and their associated camera data (data that is specific to each camera) are described. For discussion, the illustration 300 is a two-dimensional top-down view that places two cameras, camera 1 (302) and camera 2 (304), on a cartesian coordinate system demarked by X axis (270) (along the bottom of the page) and Y axis (272) (up along the short side of the page). In the described example embodiment, camera 1 (302) and camera 2 (304) are on different vehicles. In other embodiments, camera 1 (302) and camera 2 (304) are on the same vehicle. In still other embodiments, a camera is on stationary infrastructure.

A pedestrian or other object of interest (OOI) is demarked object 50, external to the two cameras. In the example, the location of object 50 is shown as a point (354, 356) on the X-Y axis. It is to be understood that object 50, the vehicles, and their associated cameras, each also have dimensions in the Z direction (i.e., coming out of the page), and the process described herein to determine the distance in the X direction to object 50 may be similarly utilized to also determine distances to object 50 in the Y and Z directions.

The object 50 is distance or depth D 301 from the camera 1 302. For simplifying purposes, the camera 1 location is taken as the same as its aperture (306) location, which is also used to represent the host vehicle location. Likewise, with camera 2. In practice, upon solving for D 301, adjustments may be made, using readily available data, to accommodate differences in these components, such that a desired depth between a host vehicle and the object is produced.

The cameras are described by their apertures, focal lengths, and image surfaces; however, it may be appreciated that, in practice the cameras have additional features as presently known in the art. Image surfaces are planar and two-dimensional. Camera 1 (302) is shown having a pinhole aperture 306, a focal length 308, and an image 1 surface 312; image 1 surface 312 is perpendicular to the measure of the focal length 1 (308). Camera 1 (302) produces, at any given time, an image or reflection referred to as reflection 1. Camera 2 (304) is shown having a pinhole aperture 314, a focal length 2 (316), and an image 2 surface 320; image 2 surface 320 is perpendicular to the measure of the focal length 2 (316). Camera 2 (304) produces, at any given time, an image or reflection referred to as reflection 2. Aperture 306 is located at (358, 360) and image 1 surface 312 is located at X=368. Aperture 314 is located at (362, 364) and image 2 surface 320 is located at X=366.

Each camera may capture images and/or reflections as discrete and singular events (also referred to as a snapshot), or as a continuous, sequential, time stamped series of images and/or reflections, such as in a movie. Further, each image and/or reflection may be considered a scene, and therefore, within an image (scene), there may be an object of interest (OOI), such as object 50. When the OOI is identified in a first reflection in camera 1, camera 1 data further includes a camera 1 distance CD1 326 from camera 1 aperture 306 to the object 50. When the OOI is identified in a second reflection in camera 2, the camera 2 data further includes a camera 2 distance CD2 328 measured from the camera 2 aperture 314 to the object 50.

Accordingly, as used herein, "camera data" that is transmitted, shared, exchanged, and processed, by control modules, in the determination of D 301, may include, for each camera, any combination of: location and orientation of an aperture (with respect to a coordinate system and/or as associated with a vehicle or structure); a focal length 308; a location and orientation of an image surface 312; a reflection, a time stamp of when the reflection was taken, and when an object of interest OOI is identified therein, a camera distance from the camera's aperture to the OOI. It may be appreciated that when the object is two or three dimensional, the reflection of the object 50 on the two-dimensional image surface may comprise a plurality of points clustered together, having a width (such as width 1 310 and width 2 318) and a height. The method for determining depth described herein may be repeated in the X, Y direction for each point of the plurality of points. In addition, the method described may be repeated to acquire a depth in the Z direction.

The camera data is shared via wireless transmissions (wireless links 70, or via wireless networks 250), and utilized in the distance determinations described herein. Since the wireless links 70 and wireless networks 250 exchange fine time-measurement information between the transceivers of any two communication entities, the timestamp information allows the recipients to properly time synchronize the various measurements included in the camera data.

In operation, vectors, representing light rays, are reflected and extend from object 50 through aperture 306, creating a reflection 1 of the object OOI at a point on image 1 surface 312, the reflection 1 having width 1 310. Extending a line from the focal length 308 parallel to the X axis 270 (distance 301), yields a similar triangle, with angle 370 equal to angle 372. Width 1 310 therefore corresponds to y_length 322. Distance 301 is the variable that method 500 generates. Using similar triangle principles, Equation 1 is derived, from camera 1, as follows:

(width 1 310)/(focal distance 1 308)=y_length 322/(distance 301)

Similarly, vectors, representing light rays, are reflected and extend from object 50 through aperture 314, creating a reflection 2 of the object OOI at a point on image 2 surface 320, the reflection 2 having width 2 318. Extending a line from the focal length 316 parallel to the X axis 270 (distance 303), yields a similar triangle and width 2 318 therefore corresponds to second y_length 324. Using similar triangle principles, Equation 2 is derived, from camera 2, as follows:

(width 2 318)/(focal distance 2 316)=second y_length 324/(distance 303)

As mentioned, the processor 150 and the program 162 form a distance determination processing engine that continually, and in real time, processes various data received and generates depth information for use in stereo vision images in accordance with a set of rules encoded in the program 162. The depth/distance determinations provide enhanced stereo vision images over other image techniques. The distance determination processing engine utilizes these similar triangle principles and applies additional rules and processing steps, as described in connection with FIGS. 4-5 below.

Figure 4:
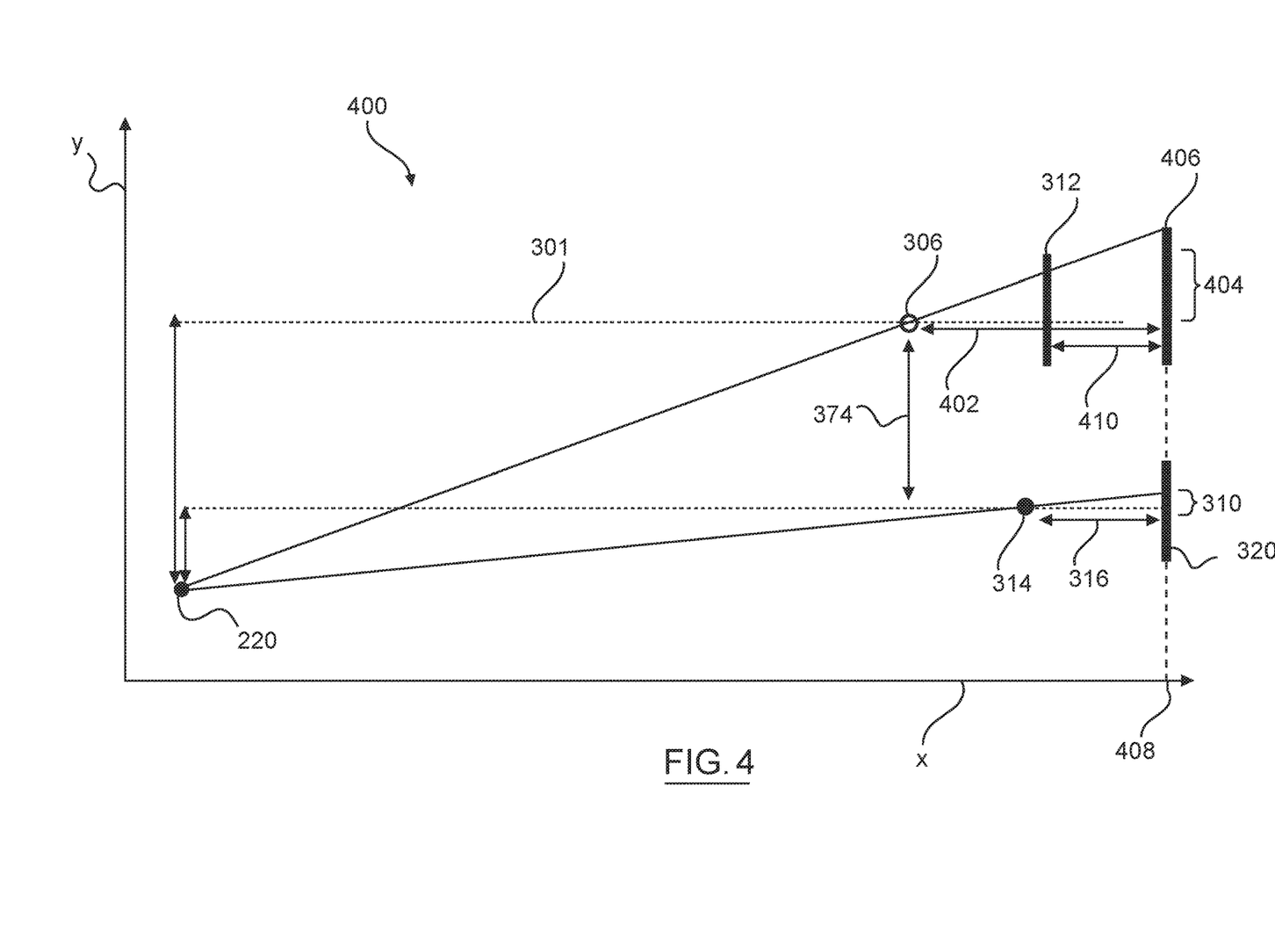
Figure 5:
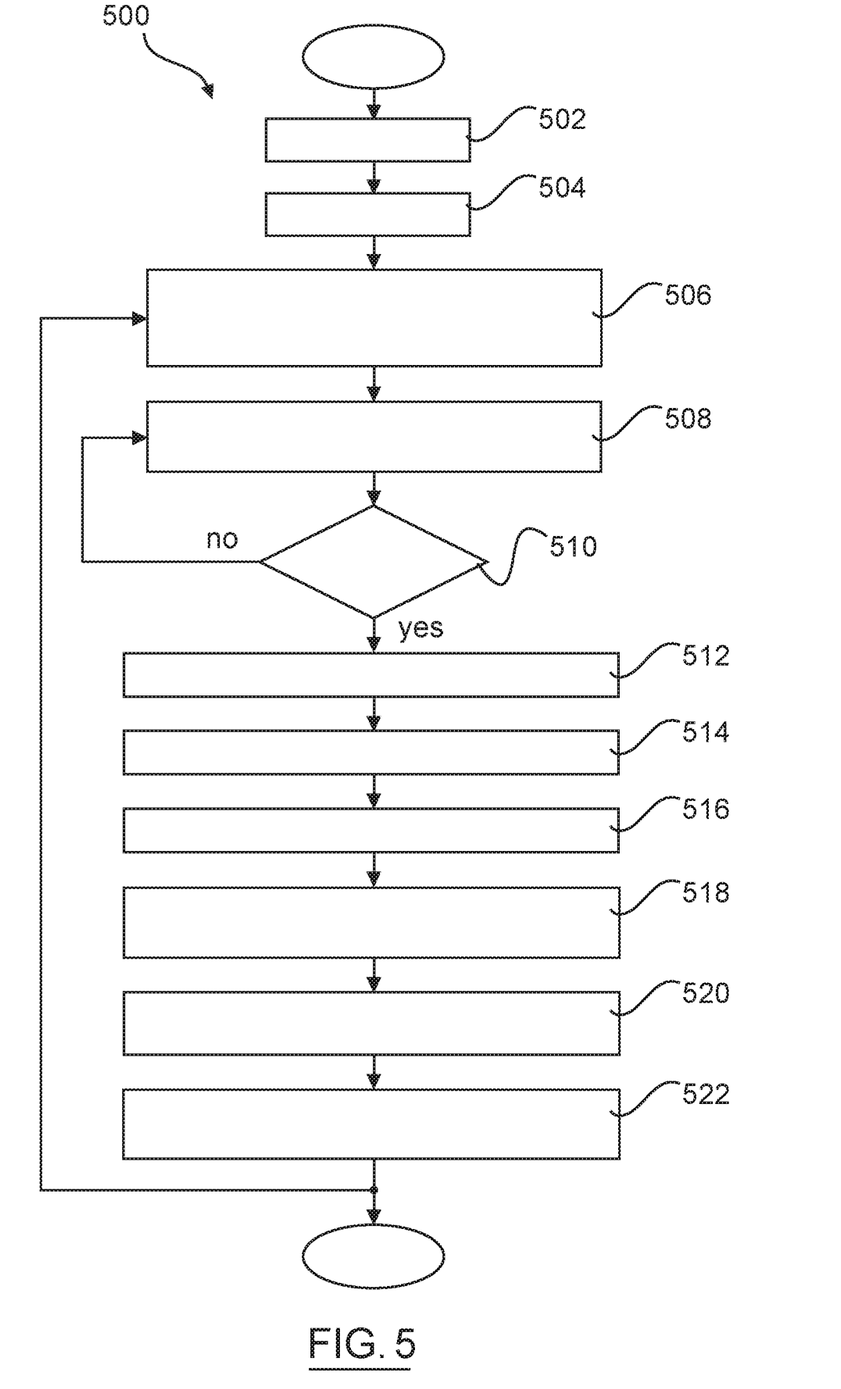
FIG. 5 provides a flow chart for a method for determining depth information for a vehicle having a camera, in accordance with an exemplary embodiment.

Moving now to FIGS. 4-5, and with continued reference to FIGS. 1-3, a method 500 for determining depth information in a host vehicle 100 through collaboration between vehicles is described, in accordance with an embodiment. The method 500 facilitates communication between cooperating vehicles, such as the host vehicle 100 and one or more neighbor vehicles (for example vehicle 204), in a manner that facilitates determination of a distance to an object 50 and generates a stereo vision image including the object 50 and its surrounding, using the determined distance. Method 500 represents various embodiments of a method for distance determinations in vehicles. For illustrative purposes, the following description of method 500 may refer to elements mentioned above in connection with FIGS. 1-4. In practice, portions of method 500 may be performed by different components of the described control system 102. It should be appreciated that method 500 may include any number of additional or alternative tasks, the tasks shown in FIG. 5 need not be performed in the illustrated order, and method 500 may be incorporated into a more comprehensive procedure or method having additional functionality not described in detail herein. Moreover, one or more of the tasks shown in FIG. 5 could be omitted from an embodiment of the method 500 as long as the intended overall functionality remains intact.

The method starts, and at 502 the control module 104 is initialized. Initialization may comprise uploading or updating instructions and applications 160, program 162, stored variables 164, and the various lookup tables stored in the database 158. Predetermined variables may include, for example, predetermined camera specific data, times to use as thresholds, authentication protocols for received camera data, and the like. In some embodiments, program 162 includes additional instructions and rules for rendering information differently based on type of display device in display system 108. Initialization at 502 may also include identifying the remote server 252 and related communication protocols.

At 504, vehicle operation begins. This may be when a vehicle drive or ignition cycle begins, for example when a driver approaches or enters the vehicle 100, or when the driver turns on the vehicle 100 and/or an ignition therefor (e.g. by turning a key, engaging a key fob or start button, and so on). In one embodiment, the steps of the method 500 are performed continuously during operation of the vehicle 100. It will also be appreciated that, in various embodiments, the steps of the method 500 may be performed by multiple vehicles at the same time, such as the vehicle 100 and the second vehicle 204.

During operation of a vehicle 100, camera data from its cameras 118 may be continuously obtained, or obtained on command. Specifically, a first camera data from a first camera onboard a first vehicle is obtained. The first camera data includes a first camera image that is reflection 1. Reflection 1 may be a single point or a full scene. As mentioned, in various embodiments, camera images that are reflections are obtained from one or more of the cameras 118 of the host vehicle 100 of FIG. 1. Also, as mentioned, the camera images may include still images (also called snapshots) and/or video camera images from one or more points of view for the vehicle 100. In various embodiments, the camera data is provided to the processor 156 of FIG. 1. Also in various embodiments, camera data (e.g., including camera images) may be received by one or more additional vehicles, such as the second vehicle 204 of FIG. 2 (e.g., from cameras of the second vehicle 204) and/or from the remote server 252.

At 506, the host vehicle 100, having thereon camera 1, obtains first camera data comprising a first reflection. Within the first reflection, an object of interest (OOI) (e.g., object 50) to which a distance from the first camera (i.e., distance D 301) is required. The camera 1 data including camera 1 distance CD1 326. In some embodiments, the OOI is a three dimensional object comprising a plurality of points. In other embodiments, the OOI is simply a point on the coordinate system.

At 508, the host vehicle 100 searches for another camera that can "see" the OOI. As used herein, "to see" means that the OOI is in a field of view of another camera (camera 2) at another location (for example, vehicle 2), and that light rays from the OOI are detected through a respective aperture in camera 2, resulting second camera data having therein a second reflection including the OOI. The second camera data further comprising a second focal length, and a second distance to the OOI based on the second reflection. Referring again to FIG. 3, vehicle 204 has the pedestrian 220 in a field of view of a camera, whereas vehicle 210 has a blocked field of view with respect to the pedestrian 220; therefore, vehicle 210 has at least one camera that does not have a field of view including the OOI.

Part of searching for another camera that can also see the OOI may include searching for and discovering other cooperating vehicles. Vehicles are determined to be cooperating when they are in wireless communication with each other, and when they have additionally passed various authentication and identification protocols. In other embodiments, the method searches cameras that are located on infrastructures, and queries them in the search for another camera that can also see the OOI.

At 510, the method 500 determines whether a second camera that can see the OOI has been found. In the example of FIG. 5, a second vehicle (for example, vehicle 204) that has a camera 2 that can also see the OOI has been found. In an embodiment, at 510, various authentication and identification protocols are assumed satisfied when it is determined that a camera 2 that can also see the OOI has been found. Also in an embodiment, at 510, the method 500 may determine whether the first and second camera share the same field of view (FOV). In an embodiment, when the cameras share the same field of view, they communicate exclusively via wireless links 70. The method 500 repeats STEPS 508 and 510 until an appropriate camera 2 (i.e., one that can also see the OOI) has been found.

At 512, responsive to finding the appropriate camera 2 100, the control module 104 receives, from the camera 2, second camera data including the OOI. At 514, also responsive to finding the appropriate camera 2 on vehicle 2, the control module 104 receives additional identifying information associated with the location of camera 2. In the example, camera 2 is on the second vehicle (also referred to as the vehicle 2), and the identifying information is the vehicle data from vehicle 2. The vehicle data includes location, direction of travel, speed, acceleration, and other related information that may be processed with host vehicle data in later steps. As may be appreciated, in embodiments in which the two cameras are on the host vehicle, the host vehicle information applies to both cameras. In embodiments in which the camera 2 is on an infrastructure, the identifying information may include a three-dimensional location and orientation of the camera 2.

After 512 and 514, the control module 104 has all necessary data for placing the host camera (camera 1) and the camera 2 on a cartesian coordinate system in order to process the camera image data as described herein. At 516, a distance (374) between the two cameras may be determined by processing the respective camera locations. Distance 374 is measured perpendicularly with respect to the focal lengths; information to perform distance 374 determination may be included in a combination of the camera data and the identifying information, such as the vehicle information, that is shared wirelessly between participating vehicles and infrastructure. At 518 the time stamps of image 1 and image 2 are checked and aligned so that camera images taken at substantially the same time are processed. Aligning the time stamps may involve comparing the times and assuring that a delta in time difference between them does not exceed a predetermined threshold. When the time stamps are aligned the cameras may be determined to be time synchronized.

At 520, distance determinations are performed for the OOI as described herein. The resulting distance(s) provide the technical effect of supporting real-time stereo vision in an operating host vehicle 100, or another cooperating vehicle. Accordingly, at 520, the method 500 may generate, on the display system 108, a stereo vision image using the distance determinations for the OOI.

As depicted in FIG. 4, the two cameras do not have the same field of view (FOV). The image 1 surface 312 of the camera 1 is at a distance 410 to be aligned with the image 2 surface 320 (shown as image surface 406). Again, the light rays are reflected and extend from object 50 through aperture 306. In FIG. 4, the reflection 3 on image surface 3 406 has width 3 404. Using similar triangles, the new focal 1 length 402 is equal to the original focal length 1 308 plus distance 410. The previously measured value for 324 is equal to y_length 322 minus 374. Similar triangle geometry concepts can be applied to determine the following:

(width 3 404)/((focal length 1 308)+(distance 410))=322/(distance 301)      Equation 3:

(image 2 width 318)/(focal distance 2 316)=(322−374)/(301+410)      Equation 4:

Next, Equation 3 is solved for 322, and Equation 4 is solved for 322. The two equations for 322 are equated. Dropping the textual labels, this yields Equation 5:

(404/(308+410))(301)=((318/316)((301+410))+374

Recall that distance D 301 is the unknown, and what is desired for use in enhanced depth perception provided in stereo vision images. Equation 5 can now be solved for the distance D 301; distance D 301 is a distance determination for the object 50 (OOI). Note that by performing the distance determinations in real-time, the previously described vehicle data, such as the speed and acceleration of each vehicle, are incorporated into the processing of Equation 5 to determine the distance D 301.

To the extent that any planar image may be considered an array of points, and a subset plurality of those arrayed points correspond to the object 50 of interest (OOI), the above described method may be repeated for each point in the plurality of points, providing, for each point, a respective distance 301.

The determination of the depth (distance D 301), produces a variety of advantageous technical effects. In an example, at 522, the method 500 may use the distance determinations to generate commands for the display system 108 to render a stereo vision image including the OOI. In another example, at 522, the method 500 may use the distance determinations generate commands for an alert system for the driver in the host vehicle 100 or other vehicles and/or in a control algorithm for controlling autonomous vehicles.

At 522, additional processing may include repeating the method 500 over time on a single point of the OOI, and time-stamping the resulting distances D 301. For example, after a first pass through method 500, at time t1, distance D 301-1 is generated; after a second pass through the method 500, at time t2, distance D 301-2 is generated, and so on. The time-stamped distances may then be processed to determine, for the OOI, its movement through space, measured as a velocity and an acceleration. Additional processing may include repeating the method 500 on multiple points of the OOI.

Also, at 522, results of the distance determinations may be transmitted to wireless communication networks 250, the remote server 252 and/or shared with cooperating vehicles via wireless links 70. In some cases, transmitting the D 301 to wireless communication networks 250, the remote server 252 and/or shared with cooperating vehicles via wireless links 70 means transmitting it to a third vehicle, such as vehicle 210, that is not able to produce its own camera image including the OOI (i.e., the third vehicle not able to "see" the OOI, for any of a variety of reasons). It is understood that in sharing the distance determinations, the cameras used, their locations, and the time at which the distance determinations were performed is associated together and shared as a block of information. Accordingly, as part of this block of information, individual snapshot camera images may be shared, a sequence of camera images may be shared, object 50 (OOI) distances and locations may be shared, and object velocity and object accelerations may be shared.

In some embodiments, the determination of D 301 is subsequently confirmed based on a comparison to a depth determination D' to the same OOI made by the camera 2. This implies that an adjustment is made to account for the different locations of the host camera and the camera 2. Further, where there is a plurality of cooperating vehicles, each vehicle of the plurality of vehicles determines, for the OOI, (a) a location, (b) distance, (c) a velocity, and (d) an acceleration, hereinafter referred to as a plurality of determinations. For example, wherein the first camera and the second camera are a first pair of cameras providing a first determined OOI distance and a first determined velocity; a second pair of cameras that are different than the first pair of cameras, may make a second determined OOI distance and a second determined OOI velocity. The control module is further configured to: receive, from the second pair of cameras the second determined OOI distance and the second determined OOI velocity for processing, voting, and confirming on-board determinations. In doing so, like determinations may be aggregated. I.e., the first determined OOI distance and the second determined OOI distance are two of a plurality determined OOI distances; and, the first determined OOI velocity and the second determined OOI velocity are two of a plurality of determined OOI velocities. Based thereon, the control module is further configured to process the received plurality of determined OOI distances to establish a high-fidelity grid of the OOI's location based thereon. Further still, each determination of the plurality of determinations may be voted on, using a weighting system (each camera having a unique weight), resulting in a voted final value of (X, Y, and Z) for the OOI.

Further, where there is a plurality of cooperating vehicles, the plurality of determinations, and, for each, the respective camera data, may be stored in memory and aggregated at 522. In certain embodiments, each vehicle aggregates camera data from itself and from other nearby vehicles (e.g., via the processor 156 of the vehicle 100 of FIG. 1, and/or from a non-depicted processor of the second vehicle 204 of FIG. 2) and/or remote server 252 (e.g., from a non-depicted processor thereof). In certain embodiments, the aggregation may be performed, in whole or in part, by the remote server 252 of FIG. 2. In certain embodiments, during these aggregation step(s), the consensus of a plurality of cooperating vehicles on any of (i) object location, (ii) object velocity, and (iii) object acceleration, is generated by the information provided by a number of vehicles and/or infrastructure, weighted by their respective confidence based on their camera features and image quality.

After 522, the method 500 may return to 506 or end. In summary, for any two cameras in this method 500, each camera has an aperture. The cameras, and the location of their apertures, can be placed on a cartesian coordinate system, and reflected lines between the OOI and the aperture may be drawn to thereby identify an intersection of the lines. The intersection of the lines is taken as the location of the OOI. Therefore, the distance to an OOI behind a host vehicle may also be determined by this method, so long as the reflected lines intersect. Additionally, while an entire reflected image is described as being captured on an image surface, in various embodiments, only a single point is needed to make a distance determination.

Accordingly, the systems, vehicles, and methods thus provide for potentially improved situation awareness and control of vehicles, for example when certain objects may be occluded or blocked with respect to a camera of the vehicle. For example, in various embodiments, camera data from different vehicles and/or infrastructure is used to generate one or more global static graphs, dynamic time-evolving situation awareness graphs, and/or dynamic time-evolving graphs that can be shared with vehicles along a roadway.

It will be appreciated that the systems, vehicles, and methods may vary from those depicted in the Figures and described herein. For example, the vehicle 100, the cameras 118, the control system 102, the navigation system 106, the display system 108, and/or components thereof of FIG. 1, and/or the additional vehicle 202, wireless networks 216, remote servers 218, and/or implementations of FIG. 2, may vary in different embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A method comprising:
   at a control module,
   (a) obtaining from a first camera onboard a first vehicle, first camera data comprising a first focal length and a first reflection including an object of interest (OOI) to which a distance, D, from the first vehicle is desired;
   (b) identifying a second camera with second camera data having therein a second reflection including the OOI, the second camera being onboard a second vehicle, the second camera data further comprising a second focal length, and a second OOI reflection;
   (c) receiving from the second camera, the second camera data;
   (d) determining a distance between the first camera and the second camera;
   (e) time synchronizing the first camera data and the second camera data; and
   (f) processing the first camera data, the second camera data, and the distance between the first and second cameras to determine the D.

2. The method of claim 1, wherein:
   first camera data further includes (i) a location and orientation of a first aperture, (ii) a location and orientation of a first image surface, and (iii) a time stamp for the first reflection; and
   second camera data further includes (i) a location and orientation of a second aperture, (ii) a location and orientation of a second image surface, and (iii) a time stamp for the second reflection.

3. The method of claim 2, further comprising:
   referencing first vehicle data including a first vehicle location;
   receiving second vehicle data including a second vehicle location; and
   determining the D further based on the first vehicle location and the second vehicle location.

4. The method of claim 3, further comprising:
   time-stamping the D, as D-1;
   repeating (a)-(e) to generate a second D; and
   time-stamping the second D, as D-2.

5. The method of claim 4, further comprising determining a velocity of the OOI using D-1 and D-2.

6. The method of claim 5, further comprising determining an acceleration of the OOI using D-1 and D-2.

7. The method of claim 4, further comprising transmitting the D-1 and the D-2 to a vehicle that is not able to produce its own camera image including the OOI.

8. The method of claim 4, further comprising using the D to generate commands for an alert system or in a control algorithm for controlling autonomous vehicles.

9. A system comprising:
   a first camera onboard a first vehicle, providing first camera data comprising a first focal length and a first reflection including an object of interest (OOI) to which a distance, D, from the first vehicle is desired;
   a second camera with second camera data having therein a second reflection including the OOI, the second camera being onboard a second vehicle, the second camera data further comprising a second focal length, and a second OOI reflection; and
   a control module configured to process first camera data and second camera data to:
   (a) determine a distance between the first camera and the second camera;
   (b) time synchronize the first camera data and the second camera data; and
   (c) process the first camera data, the second camera data, and the distance between the first and second cameras to determine the D.

10. The system of claim 9, wherein:
    first camera data further includes (i) a location and orientation of a first aperture, (ii) a location and orientation of a first image surface, and (iii) a time stamp for the first reflection; and
    second camera data further includes (i) a location and orientation of a second aperture, (ii) a location and orientation of a second image surface, and (iii) a time stamp for the second reflection.

11. The system of claim 10, wherein the control module is further configured to:
    reference first vehicle data including a first vehicle location;
    receive second vehicle data including a second vehicle location; and
    determine the D further based on the first vehicle location and the second vehicle location.

12. The system of claim 11, wherein the control module is further configured to:
    time-stamp the D, as D-1;
    repeat (a) and (b) to generate a second D; and
    time-stamp the second D, as D-2.

13. The system of claim 12, wherein the control module is further configured to determine a velocity of the OOI using D-1 and D-2.

14. The system of claim 13, wherein the control module is further configured to determine an acceleration of the OOI using D-1 and D-2.

15. The system of claim 14, wherein the control module is further configured to transmit the D-1 and the D-2 to a vehicle that is not able to produce its own camera image including the OOI.

16. The system of claim 15, using the D to generate commands for an alert system or in a control algorithm for controlling autonomous vehicles.

17. A vehicle comprising:
    a navigation system;
    a first camera, providing first camera data comprising a first image, a first focal length and a first reflection including an object of interest (OOI) to which a distance, D, from the vehicle is desired; and
    a control module operationally coupled to the navigation system and the camera, the control module configured to:
    search for a second camera having second camera data including a second image having therein the OOI, and a second focal length;
    receive, from the second camera, the second camera data;
    determine a distance between the first camera and the second camera;
    time synchronize the first camera data and the second camera data; and
    determine the D, using the first camera data, the second camera data, and the distance between the first and second cameras.

18. The vehicle of claim 17, wherein the control module is further configured to:
    time-stamp the D, as D-1;
    determine a second D by repeating processing first camera data, second camera data, and the distance between the first and second cameras;

time-stamp the second D, as D-2;
determine a first velocity of the OOI based thereon; and
transmit the D-1, the D-2, and the OOI velocity to a wireless network.

19. The vehicle of claim 17, wherein the first camera and the second camera are a first pair of cameras providing a first determined OOI distance and a first determined velocity, and wherein the control module is further configured to:
receive, from a second pair of cameras that are different than the first pair of cameras, a second determined OOI distance and a second determined OOI velocity.

20. The vehicle of claim 19, wherein:
the first determined OOI distance and the second determined OOI distance are two of a plurality determined OOI distances;
the first determined OOI velocity and the second determined OOI velocity are two of a plurality of determined OOI velocities; and
the control module is further configured to process a received plurality of determined OOI distances to establish a high fidelity grid of the OOI's location based thereon.

* * * * *